(12) United States Patent
Waggoner et al.

(10) Patent No.: US 11,213,159 B2
(45) Date of Patent: Jan. 4, 2022

(54) ADDITIVE DELIVERY SYSTEMS AND CONTAINERS

(71) Applicant: Cirkul, Inc., Sarasota, FL (US)

(72) Inventors: Garrett S. Waggoner, Sarasota, FL (US); Andrew Gay, Mill Creek, WA (US); Christopher Jasperse, Pittsburgh, PA (US)

(73) Assignee: Cirkul, Inc., Tampa, FL (US)

( * ) Notice: Subject to any disclaimer, the term of this patent is extended or adjusted under 35 U.S.C. 154(b) by 670 days.

(21) Appl. No.: 15/791,348

(22) Filed: Oct. 23, 2017

(65) Prior Publication Data

US 2018/0296023 A1    Oct. 18, 2018

Related U.S. Application Data

(63) Continuation of application No. 14/181,354, filed on Feb. 14, 2014, now Pat. No. 9,795,242.

(Continued)

(51) Int. Cl.
    *A47J 31/00*        (2006.01)
(52) U.S. Cl.
    CPC .................................. *A47J 31/005* (2013.01)
(58) Field of Classification Search
    CPC .................................................. A47J 31/005
    USPC ............ 99/323; 222/80, 81, 83, 83.5, 145.1,
          222/145.5, 522, 523, 524, 525, 79, 145.6,
          222/567, 630, 637; 426/115, 590, 519,
          426/565, 566, 567, 130, 120; 220/501,
          220/212, 90.2, 90.4, 90.6, 85 R, 4.26,
          220/4.27, 23.86, 23.83, 505, 521, 524,
          220/568, 903; 215/6, 1 R, 1 A, 227,
    (Continued)

(56) References Cited

U.S. PATENT DOCUMENTS

| 1,674,233 A | 6/1928 | Williams |
| 1,961,321 A | 6/1934 | Young |

(Continued)

FOREIGN PATENT DOCUMENTS

| CA | 2777990 A1 | 11/2013 |
| CN | 101432221 A | 5/2009 |

(Continued)

OTHER PUBLICATIONS

English Translation of first Office Action dated Jan. 8, 2019 in China Application No. 201580062670.9.

(Continued)

*Primary Examiner* — Dana Ross
*Assistant Examiner* — Ket D Dang
(74) *Attorney, Agent, or Firm* — Rollins IP; John F. Rollins (57) ABSTRACT

A compact filtering and additive delivery system which is readily adaptable to a portable container, such as a sports bottle, and receives a modular additive container for the metered delivery of additive, such as flavor concentrate, to a stream of base liquid as the base liquid is drawn or dispensed from the container. The modular additive container configuration on the delivery system allows a consumer/user to experience different additives, such as different flavors or supplement compositions, for a given supply of base liquid, such as water, stored in the container. The system may be readily used with off-the-shelf containers, such as disposable water bottles. An additive container configuration provides modular additive delivery system as described herein.

20 Claims, 6 Drawing Sheets

Related U.S. Application Data (60) Provisional application No. 61/764,861, filed on Feb. 14, 2013.

(58) Field of Classification Search
USPC ...... 215/DIG. 7, DIG. 8; 239/310, 317, 323, 239/313; 137/218, 564.5, 101.11
See application file for complete search history.

(56) References Cited

U.S. PATENT DOCUMENTS

| | | | |
|---|---|---|---|
| 2,073,273 A | 3/1937 | Korn et al. | |
| 3,207,486 A | 9/1965 | Daniel | |
| 3,217,931 A | 11/1965 | Farrar et al. | |
| 3,255,691 A | 6/1966 | Marius et al. | |
| 3,325,056 A | 6/1967 | Lewis | |
| 3,347,403 A | 10/1967 | David | |
| 3,463,361 A | 8/1969 | Cook et al. | |
| 3,508,682 A | 4/1970 | Hollis et al. | |
| 3,760,986 A | 9/1973 | Castner et al. | |
| 3,850,346 A | 11/1974 | Richardson et al. | |
| 3,924,741 A | 12/1975 | Kachur et al. | |
| 4,115,066 A | 9/1978 | Muhle | |
| 4,132,308 A * | 1/1979 | Goncalves | B65D 51/2842 206/219 |
| 4,221,291 A | 9/1980 | Hunt | |
| 4,315,570 A | 2/1982 | Silver et al. | |
| 4,785,974 A | 11/1988 | Rudick et al. | |
| 4,838,457 A | 6/1989 | Swahl et al. | |
| 4,892,125 A | 1/1990 | Rudick et al. | |
| 5,045,195 A | 9/1991 | Spangrud et al. | |
| 5,094,861 A | 3/1992 | D'Auguste et al. | |
| 5,246,139 A | 9/1993 | Duceppe | |
| 5,325,996 A | 7/1994 | Bannigan | |
| 5,419,445 A | 5/1995 | Kaesemeyer | |
| 5,707,353 A | 1/1998 | Mazer et al. | |
| 5,899,363 A | 5/1999 | Bliss, III et al. | |
| 5,919,360 A | 7/1999 | Contaxis et al. | |
| 5,984,141 A | 11/1999 | Gibler | |
| 5,992,690 A | 11/1999 | Tracy | |
| 6,003,728 A | 12/1999 | Elliott | |
| 6,010,034 A | 1/2000 | Walthers | |
| 6,136,189 A | 10/2000 | Smith et al. | |
| 6,165,523 A | 12/2000 | Story | |
| 6,180,149 B1 | 1/2001 | Gramm | |
| 6,209,757 B1 | 4/2001 | Dumont | |
| 6,230,937 B1 | 5/2001 | Johnson et al. | |
| 6,263,924 B1 | 7/2001 | Grosser | |
| 6,395,170 B1 * | 5/2002 | Hughes | B01D 35/02 210/232 |
| 6,482,451 B1 | 11/2002 | Baron | |
| 6,517,878 B2 | 2/2003 | Heczko | |
| 6,541,055 B1 | 4/2003 | Luzenberg | |
| 6,569,329 B1 | 5/2003 | Nohren, Jr. | |
| 6,705,490 B1 | 3/2004 | Lizerbram et al. | |
| 6,705,491 B1 | 3/2004 | Lizerbram et al. | |
| 6,820,740 B1 | 11/2004 | Spector | |
| 6,854,595 B2 * | 2/2005 | Kiser | B65D 51/2878 206/219 |
| 6,959,839 B2 | 11/2005 | Roth et al. | |
| 6,981,962 B1 | 1/2006 | Lenkersdorf | |
| 7,083,071 B1 | 8/2006 | Crisp, III et al. | |
| 7,118,012 B2 | 10/2006 | Butler | |
| 7,306,117 B2 | 12/2007 | Roth et al. | |
| 7,503,453 B2 | 3/2009 | Cronin et al. | |
| 7,533,786 B2 | 5/2009 | Woolfson et al. | |
| 7,568,576 B2 | 8/2009 | Sweeney et al. | |
| 7,670,479 B2 | 3/2010 | Arett et al. | |
| 7,819,276 B2 | 10/2010 | Næsje | |
| 7,909,210 B2 | 3/2011 | Roth et al. | |
| 7,947,316 B2 | 5/2011 | Kirschner et al. | |
| 8,083,055 B2 | 12/2011 | Simonian et al. | |
| 8,141,700 B2 | 3/2012 | Simonian et al. | |
| 8,167,174 B2 | 5/2012 | Berger | |
| 8,182,683 B1 | 5/2012 | Allen | |
| 8,230,777 B2 | 7/2012 | Anson et al. | |
| 8,302,803 B1 | 11/2012 | Greenberg et al. | |
| 8,313,644 B2 | 11/2012 | Harris et al. | |
| 8,413,844 B2 | 4/2013 | Arett et al. | |
| 8,453,833 B2 | 6/2013 | Porter | |
| 8,464,633 B2 | 6/2013 | Anson et al. | |
| 8,511,465 B2 | 8/2013 | Seelhofer | |
| 8,541,039 B2 | 9/2013 | Lackey et al. | |
| 8,590,753 B2 | 11/2013 | Marina et al. | |
| 8,684,231 B2 | 4/2014 | Lane et al. | |
| 8,893,927 B2 | 11/2014 | Olson et al. | |
| 8,931,634 B2 | 1/2015 | Anderson | |
| 9,090,395 B2 | 7/2015 | Koumans | |
| 9,650,189 B1 | 5/2017 | Lawson et al. | |
| 9,771,195 B2 | 9/2017 | Lawson et al. | |
| 9,821,288 B2 | 11/2017 | Cerk et al. | |
| 10,232,998 B2 | 3/2019 | Presche | |
| 10,349,766 B2 | 7/2019 | Asseldonk et al. | |
| 10,888,826 B2 | 1/2021 | Waggoner et al. | |
| 2001/0025859 A1 | 10/2001 | Dumont | |
| 2001/0055242 A1 | 12/2001 | Deshmukh et al. | |
| 2003/0168474 A1 | 9/2003 | Widgery | |
| 2004/0007594 A1 | 1/2004 | Esch et al. | |
| 2004/0116036 A1 | 6/2004 | Nugent et al. | |
| 2004/0188280 A1 | 9/2004 | Young | |
| 2004/0262331 A1 | 12/2004 | Woolfson et al. | |
| 2005/0115845 A1 | 6/2005 | Cho | |
| 2005/0234422 A1 * | 10/2005 | Oh | B65D 25/08 604/415 |
| 2006/0021919 A1 | 2/2006 | Olson et al. | |
| 2007/0102394 A1 | 5/2007 | Olsen et al. | |
| 2007/0138179 A1 | 6/2007 | Jacobs et al. | |
| 2007/0253280 A1 | 11/2007 | Orben et al. | |
| 2008/0099487 A1 | 5/2008 | Winn | |
| 2008/0116221 A1 * | 5/2008 | Roth | B65D 47/243 222/129 |
| 2008/0149585 A1 | 6/2008 | Valentine | |
| 2008/0190958 A1 | 8/2008 | Wyner et al. | |
| 2009/0026222 A1 | 1/2009 | Seelhofer | |
| 2009/0226585 A1 | 9/2009 | Wroblewski et al. | |
| 2009/0236303 A1 | 9/2009 | Lizerbram et al. | |
| 2010/0065584 A1 * | 3/2010 | Berger | A45F 3/04 222/145.5 |
| 2010/0108715 A1 | 5/2010 | Santagiuliana | |
| 2010/0157723 A1 | 6/2010 | Vega | |
| 2010/0213223 A1 | 8/2010 | Ballentine | |
| 2011/0006071 A1 | 1/2011 | Koumans | |
| 2011/0089059 A1 | 4/2011 | Lane et al. | |
| 2011/0259769 A1 | 10/2011 | Salinas | |
| 2011/0290677 A1 | 12/2011 | Simonian et al. | |
| 2011/0290678 A1 | 12/2011 | Simonian et al. | |
| 2012/0000880 A1 | 1/2012 | Im | |
| 2012/0017766 A1 | 1/2012 | Anson et al. | |
| 2012/0031925 A1 | 2/2012 | Greenberg | |
| 2012/0223100 A1 | 9/2012 | Simonian et al. | |
| 2012/0255973 A1 | 10/2012 | Schlueter et al. | |
| 2013/0000733 A1 | 1/2013 | Gothard et al. | |
| 2013/0008919 A1 | 1/2013 | Honan et al. | |
| 2013/0240564 A1 | 9/2013 | Albaum | |
| 2013/0319915 A1 | 12/2013 | Gellibolian et al. | |
| 2013/0334250 A1 | 12/2013 | Albaum | |
| 2014/0076173 A1 | 3/2014 | Pellaud et al. | |
| 2014/0092703 A1 | 4/2014 | Helou et al. | |
| 2014/0230659 A1 | 8/2014 | Waggoner et al. | |
| 2015/0158654 A1 | 6/2015 | Petrov | |
| 2015/0336722 A1 | 11/2015 | Brook-Chrispin et al. | |
| 2015/0336724 A1 | 11/2015 | Simonian et al. | |
| 2016/0001936 A1 | 1/2016 | Rap et al. | |
| 2016/0150914 A1 | 6/2016 | Waggoner et al. | |
| 2016/0152408 A1 | 6/2016 | Fuchs et al. | |
| 2016/0159632 A1 | 6/2016 | Wheatley et al. | |
| 2016/0317985 A1 | 11/2016 | Mutschler et al. | |
| 2017/0232406 A1 | 8/2017 | Waggoner et al. | |
| 2018/0296023 A1 | 10/2018 | Waggoner et al. | |
| 2019/0060849 A1 | 2/2019 | Waggoner et al. | |
| 2019/0291065 A1 | 9/2019 | Waggoner et al. | |
| 2020/0139313 A1 | 5/2020 | Waggoner et al. | |
| 2021/0060503 A1 | 3/2021 | Waggoner et al. | |
| 2021/0169264 A1 | 6/2021 | Waggoner et al. | |

(56) References Cited

U.S. PATENT DOCUMENTS

FOREIGN PATENT DOCUMENTS

| | | |
|---|---|---|
| CN | 101068745 B | 6/2012 |
| EP | 0795267 A2 | 9/1997 |
| EP | 1876901 B1 | 11/2011 |
| JP | H06008999 A | 1/1994 |
| JP | 2001500205 A | 1/2001 |
| JP | 2005289518 A | 10/2005 |
| JP | 2009107672 A | 5/2009 |
| JP | 2013545673 A | 12/2013 |
| WO | 1998005853 A1 | 2/1998 |
| WO | 0100521 A1 | 1/2001 |
| WO | 2011149501 A1 | 12/2011 |
| WO | 2016081925 A1 | 5/2016 |

OTHER PUBLICATIONS

English Translation of Office Action and Search Report dated May 13, 2020 in CN Application 201780013261.9.
English translation of Office Action dated Mar. 30, 2021 in Japanese Application No. 2018-545355.
English translation of Office Action dated Jul. 30, 2019 in JP Application No. 2017-545871.
EP Application 18757631.9, Supplemental European Search Report dated Nov. 16, 2020.
International Search Report and Written Opinion for International App. No. PCT/US2015/62026 dated Feb. 5, 2016 (11 pages).
International Search Report and Written Opinion of the International Searching Authority in International Application No. PCT/US19/48389 dated Jan. 17, 2020.
ISR and WO in PCT/US2017/021016 dated Jun. 6, 2017.
ISR and Written Opinion dated May 7, 2021 in PCT/US2020/062521.
Supplemental European Search Report and European Search Opinion dated Jun. 13, 2018 in EP Application No. 15861063.4.
Supplemental European Search Report and Opinion dated Jul. 9, 2019 in EP Application 17760997.1.
Supplemental European Search Report dated Nov. 16, 2020 in EP Application No. 18757631.9.

\* cited by examiner

ADDITIVE DELIVERY SYSTEMS AND CONTAINERS

CROSS-REFERENCE TO RELATED APPLICATIONS

This application is a continuation of and claims the priority benefit of U.S. patent application Ser. No. 14/181,354, filed on Feb. 14, 2014, of the same title, to be issued as U.S. Pat. No. 9,795,242, which claims the priority benefit of U.S. Provisional Patent Application Ser. No. 61/764,861 titled "BOTTLE WITH REMOVABLE FLAVOR CARTRIDGE IN WHICH FLAVOR CONCENTRATE MIXES WITH WATER AS USER DRINKS," filed on Feb. 14, 2013, the specification of these applications is incorporated in its entirety herein by reference.

BACKGROUND

1. Technical Field

The disclosure relates to dispensing and delivery systems for beverages and other products. More specifically, the disclosure relates to dispensing and delivery systems for providing an additive, such as flavoring or supplements, to a base liquid, such as water, as the base liquid is dispensed from a container. The disclosure also relates to containers for containing and storing an additive to be used in additive delivery systems.

2. Prior Art

The prior art includes various devices for providing additives to a base liquid. Such devices include pre-mix systems, such as those exemplified in U.S. Pat. No. 7,306,117, in which a predetermined amount of additive is dispensed into a base liquid within the container and mixed therewith prior to consumption.

Prior art systems also include additive delivery systems in which an additive is dispensed as a base fluid is dispensed from a container. Such delivery systems are exemplified by U.S. Pat. No. 8,230,777, which describes a dispensing system in which a base liquid flows through a supplement area containing solid supplements, and U.S. Pat. No. 8,413,844, which describes a water dispenser (pitcher) having a filter and an additive chamber in which the additive is dispensed as water is poured from the dispenser.

Such prior art systems, however, suffer from the drawbacks of requiring rather elaborate and relatively expensive dispensing systems and fail to combine filtration and additive delivery functionality in a manner that is readily adapted to portable, compact, portable containers, such as sports bottles. There is thus a need for additive delivery systems and additive containers that are readily adaptable to portable base liquid containers and which address the aforementioned and other needs in the art.

SUMMARY OF THE INVENTION

One aspect of the invention provides a compact filtering and additive delivery system, which is readily adaptable to a portable container, such as a sports bottle. The additive delivery system provides filtration and additive delivery to a base liquid while maintaining a generally consistent flow direction of the base liquid. The additive delivery system may receive a modular additive container selected by the user and provides for the metered delivery of additive, such as flavor concentrate, to a stream of base liquid as the base liquid is drawn or dispensed from the bottle. The modular additive container configuration on the delivery system allows a consumer/user to experience different additives, such as different flavors or supplement compositions, for a given supply of base liquid, such as water, stored in the container.

Another aspect of the invention provides a compact filtering and additive delivery system that may be used with off-the-shelf containers, such as disposable water bottles.

Yet another aspect of the invention provides a container configuration that is suitable for a modular additive delivery system as described herein.

Yet another aspect of the invention provides for uniform mixing of additive to a base liquid as the mixture is consumed, as well as a substantially uni-directional flow of base liquid and mixed additive/base liquid composition from the container.

BRIEF DESCRIPTION OF THE DRAWINGS

The above and other attendant advantages and features of the invention will be apparent from the following detailed description together with the accompanying drawings, in which like reference numerals represent like elements throughout. It will be understood that the description and embodiments are intended as illustrative examples and are not intended to be limiting to the scope of invention, which is set forth in the claims appended hereto.

DETAILED DESCRIPTION

Figure 1:
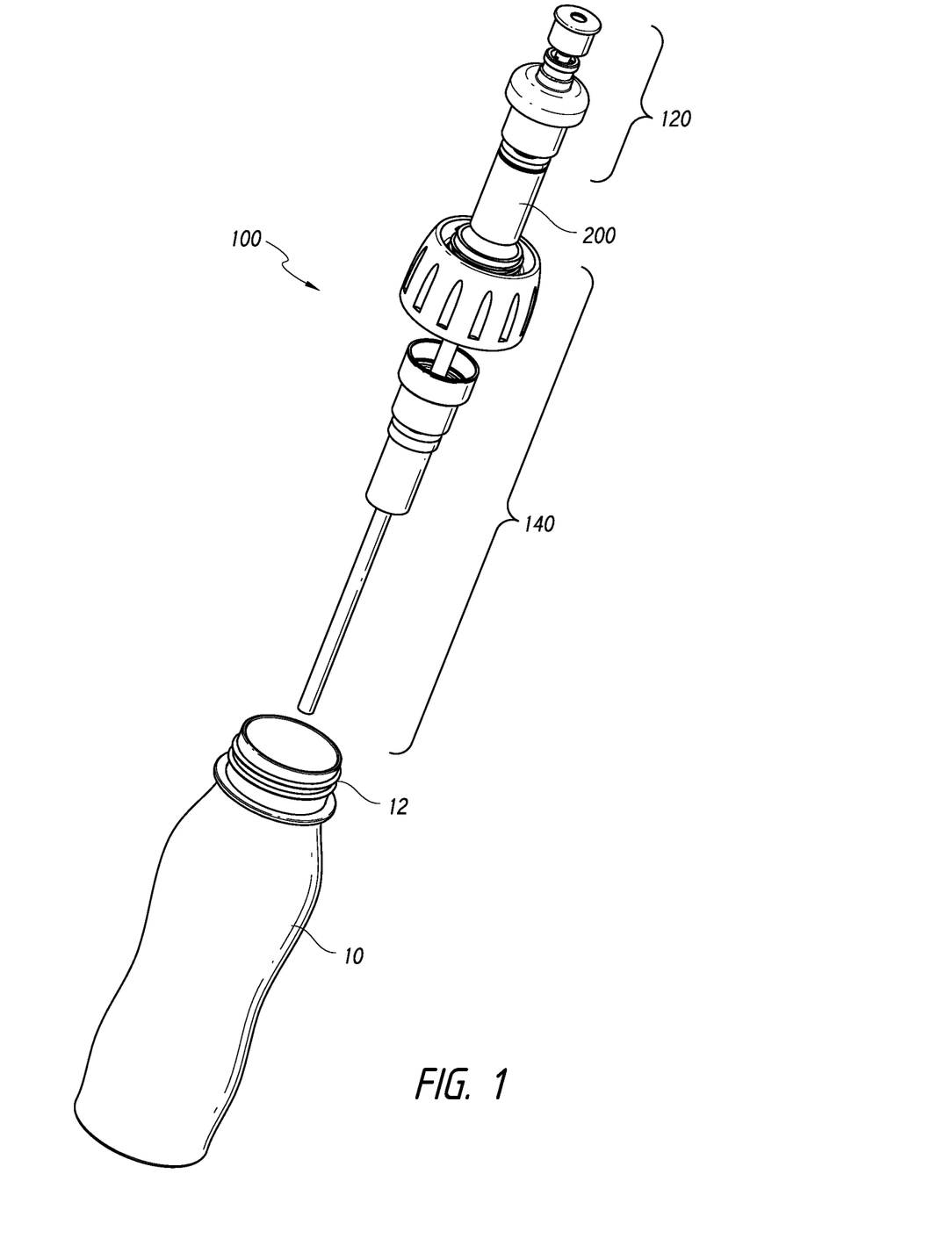
FIG. 1 is an exploded isometric view of an additive delivery system, combined with a sports bottle and filtration system according to an aspect of the invention.

Referring to FIG. 1, an additive delivery system 100 according to an aspect of the invention includes an upper cap assembly 120 and a lower cap assembly 140, in combination with a sports bottle 10. Sports bottle 10 may include an inner volume for containing a base fluid, such as water, and a threaded mouth 12 for receiving and sealingly engaging the lower cap assembly 140. As will be described in more detail below, upper cap assembly 120 and lower cap assembly 140 cooperate to house a removable additive module 200.

Figure 2:
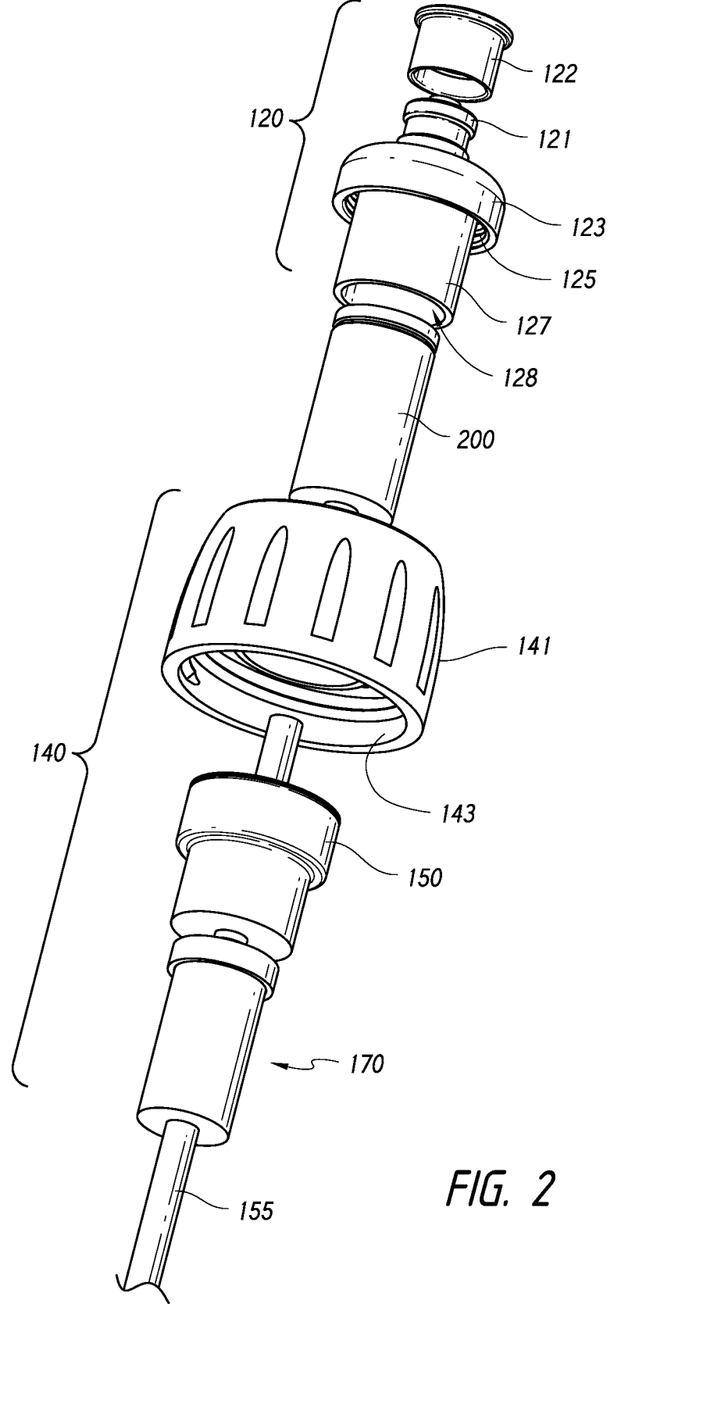
FIG. 2 is a detailed exploded isometric view of an additive delivery system according to an aspect of the invention.

Referring additionally to FIG. 2, upper cap assembly 120 may include a spout 121 and a re-sealable spout closure 122 that cooperates therewith in a known manner. Upper cap assembly may also include a cap portion 123 having threaded interior wall 125 and an additive module enclosing wall 127 defining an additive module receiving space 128 for receiving additive module 200.

Lower cap assembly 140 may include a lower cap 141 having a container engaging female threaded portion 143 and an outer surface with gripping recesses formed therein. A lower additive module enclosure 150 cooperates with the lower cap 141 and upper cap assembly 120 to house and enclose additive module 200, as will be described below. Lower cap assembly 140 may include a filter assembly 170, which houses a filter for filtering the base liquid. A delivery tube 155 extends to the bottom of the base liquid container and provides for the travel of base liquid through the filter assembly 170, lower cap assembly 140, additive module 200 and, ultimately, to spout 121, as will be described in more detail below.

Figure 3:
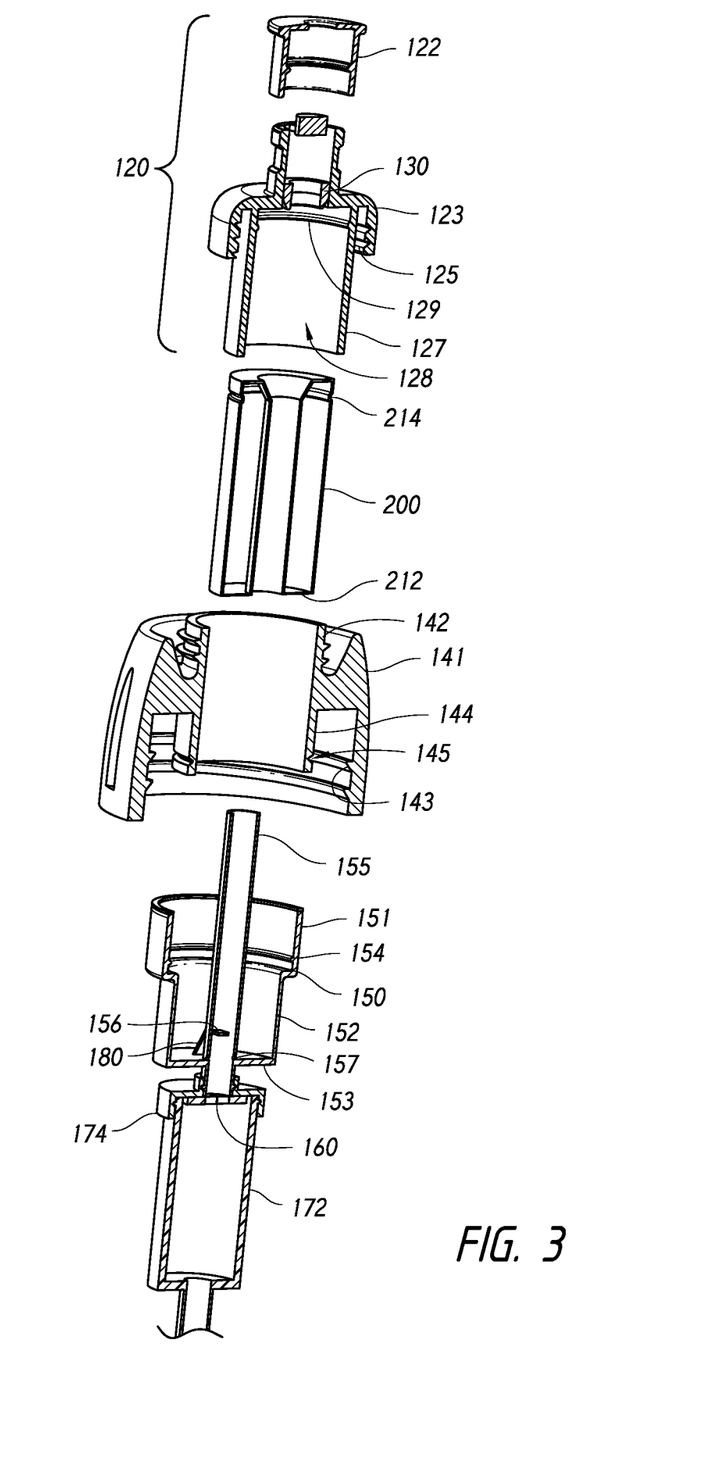
FIG. 3 is a cross-sectional exploded view of the additive delivery system of FIG. 2.

Referring additionally to the cross-sectional exploded view in FIG. 3, the additive module enclosing wall 127 of upper cap assembly 120 may include a retaining lip formed therein for engaging a retaining groove 214 on additive module 200. Lower cap assembly 140 may include an upper cap engaging male threaded portion 142 for engaging the female threads 125 on the upper cap 123. As will be recognized, this configuration allows easy removal and replacement of the additive module by the consumer as the upper cap assembly 120 may be unscrewed and removed with the additive module 200 remaining secured on the upper cap assembly 120 by way of the retaining lip 129 and retaining groove 214, which provide a snap fitting of the additive module 200 to the upper cap assembly. In addition, during removal of upper cap assembly 120, the lower cap 141 may remain secure on the container, preventing contamination or spillage of the base liquid.

According to an aspect of the invention, for safety and sanitary purposes, the additive module 200 may be provided with a transparent safety enclosure cap, which may engage the cap threads 125, and enclosed the additive module 200. In this configuration, the spout 121, spout closure 122 and safety enclosure cap (and thus the additive module, snap fit within the cap) may be sealed within a frangible thermoplastic membrane for consumer safety and product freshness. The transparent safety cap allows consumers to view the details/branding of the additive module before purchase, for example.

Lower cap 141 may also be provided with an annular wall 144 for engaging and fitting within a correspondingly-shaped upper annular wall 151 on the lower additive module enclosure assembly 150. Annular wall 144 may be provided with a retaining groove 145 for receiving a cooperating retaining lip 154 formed on the interior of upper annular wall 151 of the lower additive module enclosure assembly 150. A lower annular wall 152 and bottom wall 153 define a space for receiving a lower portion of the additive module 200. One or more additive module membrane piercing projections 180 may extend upward from the bottom wall 153 to pierce a frangible membrane 212.

Tube 155 extends upward through the lower module enclosure assembly 150 to permit flow of the base liquid. One or more metering ports 157 may be formed in the tube 155 near the bottom wall 153 to permit flow of additive concentrate from the interior of lower additive module enclosure 150 to the interior of tube 155 by venturi effect as the base liquid is drawn through tube 155. One or more mixing projections 156 may extend within the interior of tube 156 to induce turbulent flow and thereby mix the additive concentrate with the base fluid.

Filter assembly 170 may include a filter housing 172, which is snapped in place on a corresponding filter housing top 174 using a lip and groove retainer. A one-way check or flapper valve 176 formed of silicone rubber may be provided at the inlet of tube 155 from the interior of filter housing 172 to prevent backflow of the base fluid into the filter housing 172. An active carbon filter element (not shown in FIG. 3) may be provided on the interior of filter housing 172, as will be described in more detail below.

Figure 4:
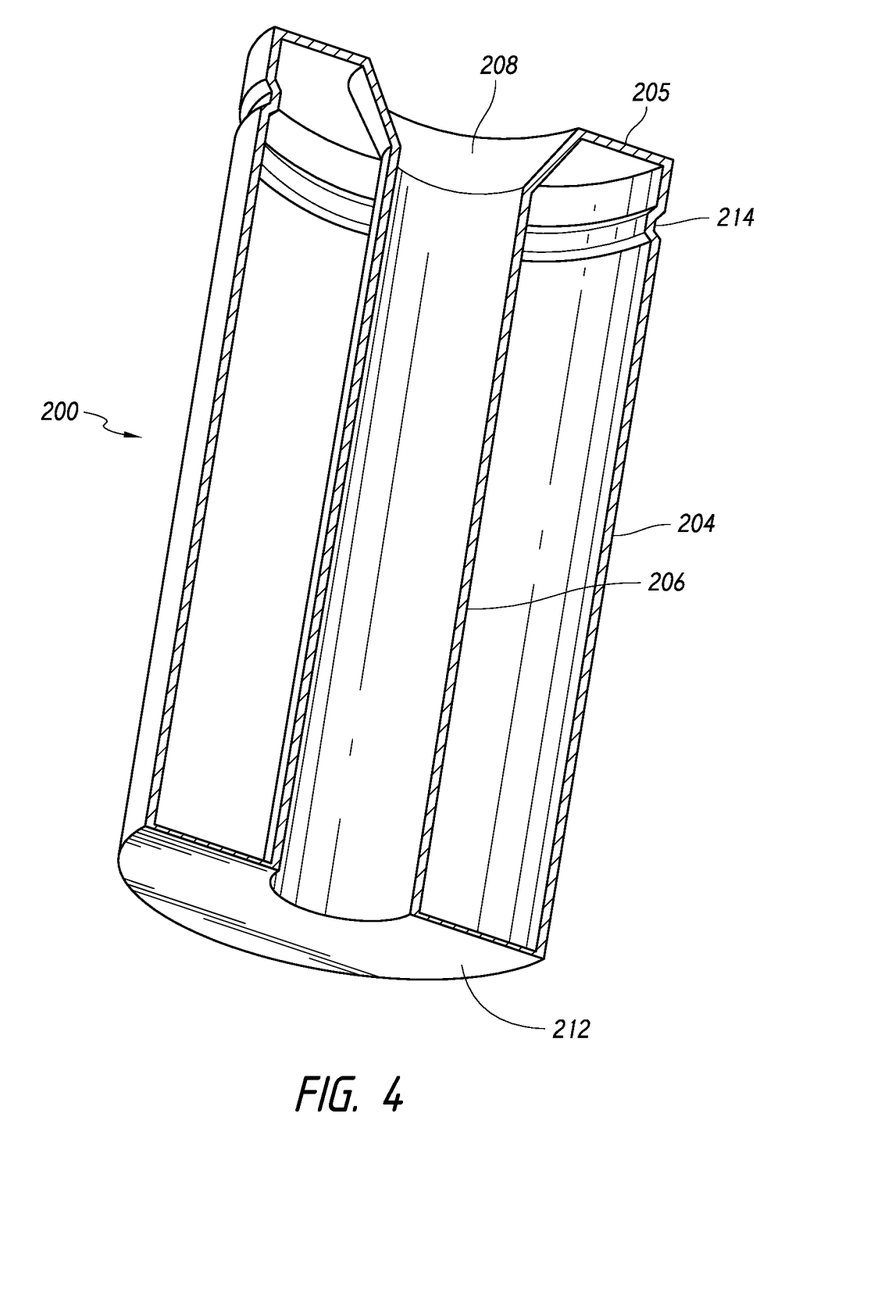
FIG. 4 is an isometric view of an additive container according to an aspect of the invention.

Referring additionally to FIG. 4, an additive module 200 according to aspects of the invention may include a generally cylindrical shape having an outer wall 204 provided with a retaining groove 214 formed therein and extending to a top wall 205 having a conical sealing surface 208. Conical surface 208 is adapted to sealingly engage a correspondingly shaped flexible seal 130 (FIG. 3), which may be made of silicone rubber or other material, and provided in upper cap assembly 120. An interior annular wall 206 defines, with upper wall 205 and outer wall 204, an interior additive containing space 210 for containing an additive, such as flavor or supplement concentrate. A frangible lower membrane 212, which may be made of foil or other material, forms a lower wall to contain and seal the additive within the module. As will be recognized, the module configuration provides for a consumer to carry and preserve a number of different additives for use with the additive delivery system and a single supply of base liquid in a container, such as a sports bottle.

Figure 5:
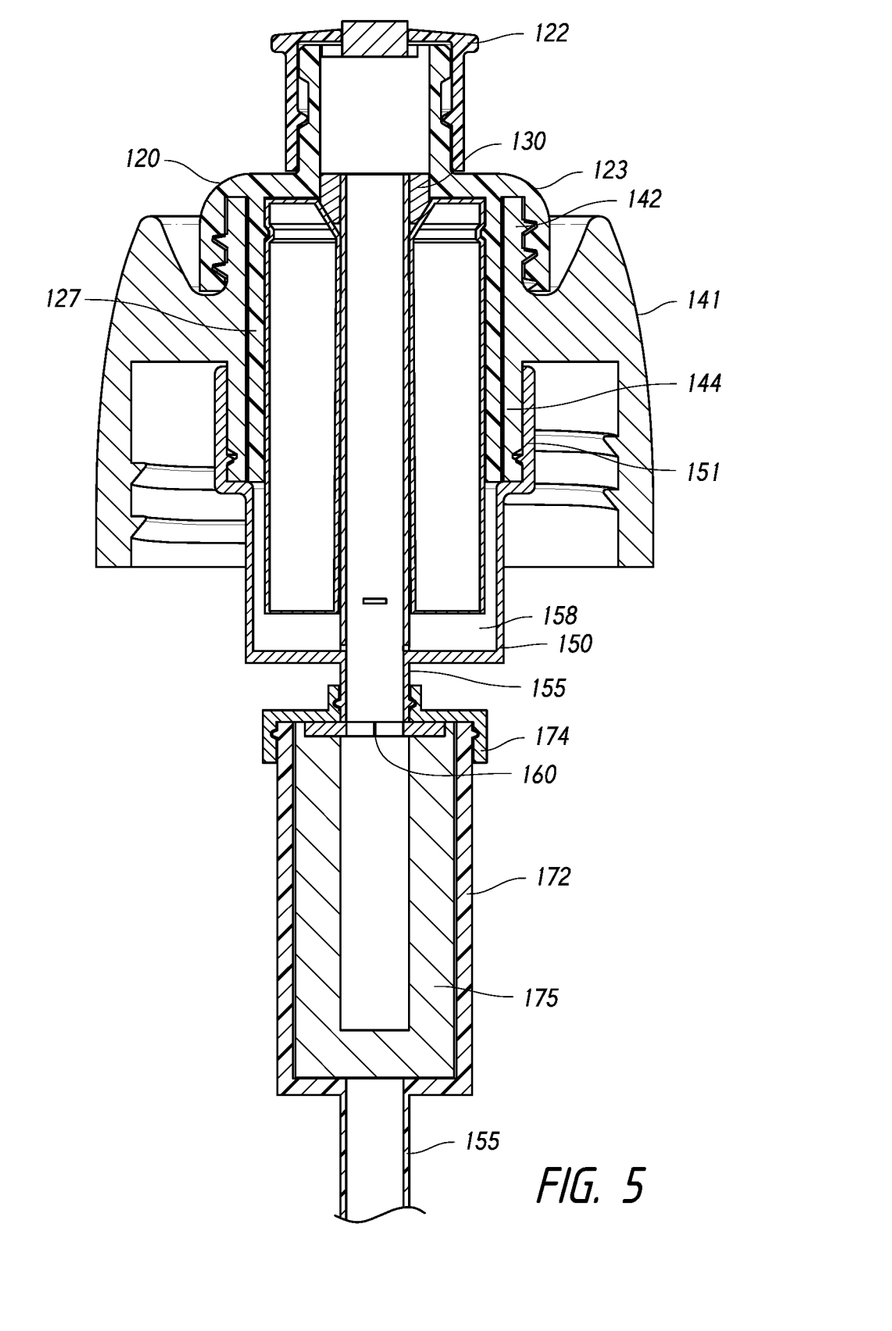
FIG. 5 is a cross-sectional view of an assembled additive delivery system according to an aspect of the invention.

FIG. 5 illustrates a cross-section of an assembled additive delivery system according to an aspect of the invention. Spout closure 122 is shown in a closed position. Upper cap 123 is shown in an engaged position (i.e., screwed on) on the male threaded portion 142 of the lower cap 141, with the additive module enclosing wall 127 of the upper cap assembly 120 extending downward into the annular opening of the lower cap 141 and securing the additive module 200 therein. The upper annular wall 151 of lower additive enclosure assembly 150 engages the module holder receiving wall 144 of the lower cap assembly 140 via lip 154 and groove 145 to provide a snap fitting. Upper cap assembly 120, lower cap assembly 140 and lower additive module enclosure assembly thereby cooperate to provide a sealed containing space for the additive module 200.

Tube 155 extends upward within the inner tube formed by inner wall 206 of additive module 200. The conical sealing surface 208 is engaged by a correspondingly shaped silicone seal 130 secured within the upper cap assembly 120. In this position, the frangible membrane 212 of additive module 200 would be pierced or ruptured by piercing projections 180 (FIG. 3) and additive concentrate stored within additive module 200 would flow into the space 158. FIG. 5 also shows a cylindrical active carbon filter element 175 housed within the filter housing 172 to filter the base fluid.

Figure 6:
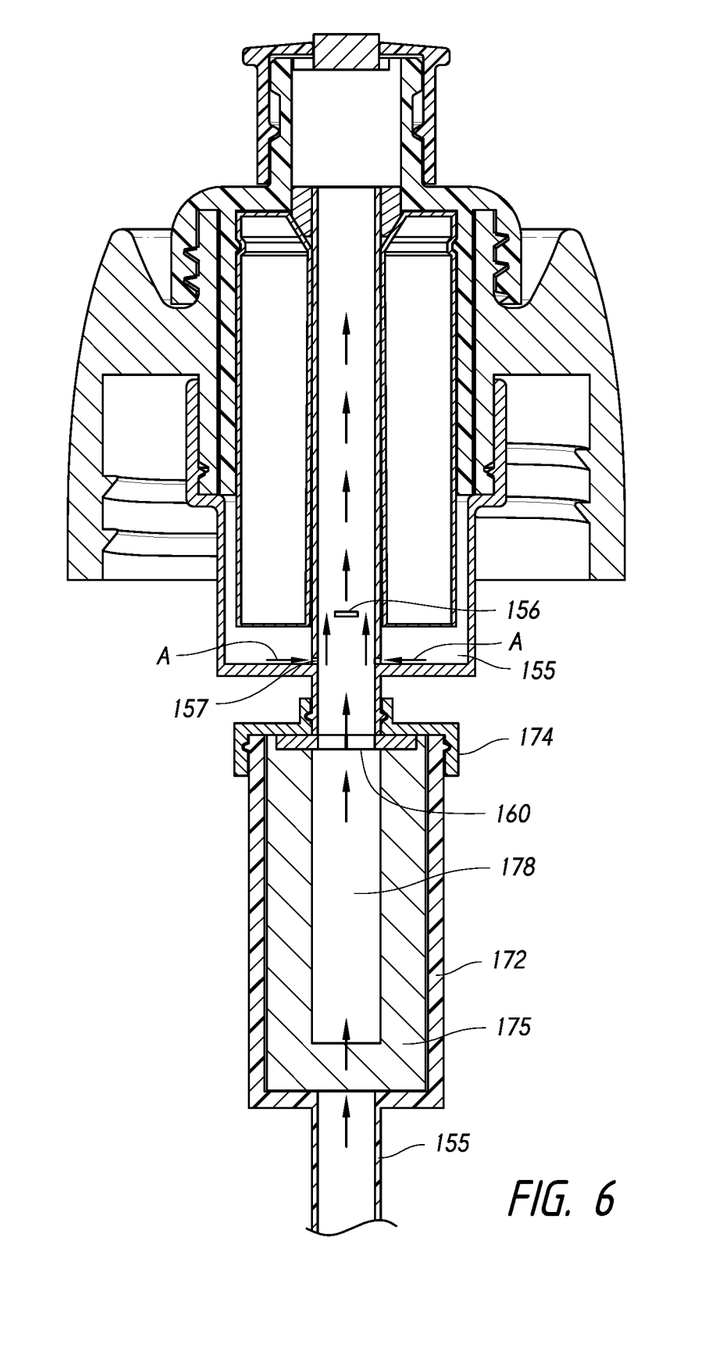
FIG. 6 is a cross-sectional view showing flow paths of an additive delivery system according to an aspect of the invention.

Referring additionally to FIG. 6, the base fluid is filtered as it flows from the lower portion of tube 155 to an interior space 178 defined by filter element 172, through the check valve 160, and upward into the upper portion of tube 155. Owing to a venturi effect, additive concentrate, represented by arrows "A" is drawn from the space 158, through metering ports 157 and into the interior of tube 155 where additive is mixed with the base fluid. Applicants have discovered that metering ports having a diameter of approximately 0.03 inches provide for suitable metering of additive liquid, while permitting the retention (non-leakage) of additive liquid from the additive module when flow of the base liquid is not occurring. As will be recognized, the diameter of metering ports may be varied depending on the viscosity of the additive liquid and other parameters such that flow occurs when needed but not when the base liquid is not flowing in the delivery tube. Mixing projection 156 enhances the mixing and uniform dilution of the additive within the base fluid. The mixed additive and base fluid composition continues up the tube 155 through the spout As will be recognized, the flow of fluid through the system may be facilitated by suction provided by the consumer or by the squeezing of the container, which may be made of a suitably flexible material, or by both. As will also be recognized, flow from the base liquid container, through the filter assembly, delivery tube and additive module is substantially in a single, linear direction, without diversion, thereby providing for efficient flow of base liquid and mixed additive/base-liquid composition from the container and providing a configuration that is particularly adaptable to a sports bottle or other compact, portable, handheld container.

As will also be recognized, the additive delivery system may be used with standard, disposable water or beverage bottles through suitable adaptation of the fastening implements on the lower cap assembly.

As will also be recognized, suitable thermoplastic polymers may be used to form the various aforementioned elements, including polyethylene terepthalate (PET), polycarbonate, high-density polyethylene (HDPE) and others.

It should be understood that implementation of other variations and modifications of the invention in its various aspects may be readily apparent to those of ordinary skill in the art, and that the invention is not limited by the specific embodiments described herein. It is therefore contemplated to cover, by the present invention any and all modifications, variations or equivalents that fall within the spirit and scope of the claims that follow.

What is claimed is:

1. A method of mixing additive with a base liquid in an additive delivery system comprising a dispensing spout, a one-way valve, an upper cap portion, a lower cap portion cooperating with the upper cap portion to define an additive module containing space, an additive module disposed within the additive module containing space and containing an additive, a base liquid flow passage for permitting flow of the base liquid thru the additive module containing space to the dispensing spout, and at least one metering port providing metered flow of the additive from the additive module to the base liquid flow passage, the method comprising:
    providing a supply of the base liquid in a container associated with the additive delivery system;
    installing the additive delivery system on the container containing the supply of base liquid;
    causing the base liquid to flow thru the base liquid flow passage;
    metering the additive thru the at least one metering port to form a mixture of the additive and the base liquid, wherein the metering results from the base liquid flowing through the base liquid flow passage;
    dispensing the mixture of the base liquid and the additive from the dispensing spout; and
    preventing backflow of the base liquid into the container with the one-way valve in the additive delivery system.

2. The method of claim 1, wherein the step of causing the base liquid to flow comprises the step of drawing the base liquid thru a delivery tube.

3. The method of claim 1, wherein the base liquid flows centrally thru the additive module containing space.

4. The method of claim 1, further comprising mixing the base liquid and the additive in the base liquid flow passage using a mixing projection.

5. The method of claim 1, further comprising the step of drawing the additive from the additive module as the base liquid is drawn thru the base liquid flow passage.

6. The method of claim 1, further comprising filtering the base liquid with a filter assembly prior to flow of the base liquid in the base liquid flow passage.

7. The method of claim 5, wherein the step of drawing the additive from the additive module includes drawing the additive into a centrally disposed base liquid flow passage.

8. The method of claim 7, wherein the additive module surrounds the centrally disposed base liquid flow passage.

9. The method of claim 8, wherein the additive module includes a flexible membrane.

10. A method of mixing additive with a base liquid in an additive delivery system comprising a dispensing spout, a one-way valve, an upper cap portion, a lower cap portion cooperating with the upper cap portion to define an additive module containing space, an additive module disposed within the additive module containing space and containing an additive, a base liquid flow passage for permitting flow of the base liquid thru the additive module containing space to the dispensing spout, and at least one metering port providing metered flow of the additive from the additive module to the base liquid flow passage, the method comprising:
    providing a supply of the base liquid in a container associated with the additive delivery system;
    enclosing the additive module within the additive module containing space;
    installing the additive delivery system on the container containing the supply of base liquid;
    causing the base liquid to flow thru the base liquid flow passage;
    in response to the base liquid flowing through the base liquid flow passage, causing the additive to flow thru the at least one metering port to form a mixture of the additive and the base liquid;
    dispensing the mixture of the base liquid and the additive from the dispensing spout; and
    preventing backflow of the base liquid into the container with the one-way valve in the additive delivery system.

11. The method of claim 10, further comprising the step of providing a filtration assembly configured to filter the base liquid prior to flow into the base liquid flow passage.

12. The method of claim 10, further comprising the step of providing a delivery tube defining part of the base liquid flow passage, wherein the delivery tube is provided with at least one mixing projection to facilitate turbulent flow and mixing within the delivery tube of the base liquid and the additive, and further comprising the step of mixing the base liquid and the additive with the mixing projection as the base liquid and the additive flow.

13. The method of claim 10, further comprising providing a piercing projection disposed within the additive module containing space for piercing the additive module, and the step of piercing the additive module with the piercing projection.

14. The method of claim 10, further comprising the step of providing the upper cap assembly with an annular additive receiving wall, the annular additive receiving wall including an additive module retaining lip for engaging a retaining groove on the additive module to thereby secure the additive module to the upper cap assembly.

15. The method of claim 10, further comprising providing an additive module enclosure assembly for enclosing a lower portion of the additive module, the lower cap portion further including a downward extending annular wall having a retaining groove therein, the additive module enclosure assembly including an upper extending annular wall having a retaining lip formed therein to engage the retaining groove and thereby forming a lower additive module receiving space.

16. The method of claim 15, further comprising providing the additive module enclosure assembly with a delivery tube extending therethrough, the delivery tube including the at least one metering port for permitting flow from the lower additive module receiving space to an interior of the delivery tube, further comprising the step of mixing additive from the at least one metering port with the base liquid as the base liquid flows through the delivery tube.

17. The method of claim 16, further comprising the step of mixing the base liquid and the additive using at least one mixing projection disposed within the delivery tube.

18. The method of claim 10, further comprising the step of providing a silicone seal disposed within the upper cap portion, the silicone seal including a conical sealing surface for engaging a corresponding surface on the additive module.

19. The method of claim 10, further comprising the step of providing a filtration assembly configured to filter the base liquid prior to flow into the additive module containing space, the filtration assembly and the additive module containing space being configured to provide for flow of the base liquid from the container through the additive module containing space in a uniform direction.

20. The method of claim 19, further comprising the step of providing a filter housing on the filtration assembly and providing a filter housing top adapted for snap fit connection to enclose a filtration element therewithin.

\* \* \* \* \*